Patented Nov. 19, 1929

1,736,404

UNITED STATES PATENT OFFICE

ERNEST HOPKINSON, OF NEW YORK, AND MERWYN C. TEAGUE, OF JACKSON HEIGHTS, NEW YORK, ASSIGNORS TO AMERICAN RUBBER COMPANY, OF EAST CAMBRIDGE, MASSACHUSETTS, A CORPORATION OF MASSACHUSETTS

PROCESS FOR TREATING RUBBER LATEX COMPOSITIONS AND ARTICLES FORMED THEREBY

No Drawing. Original application filed August 18, 1923, Serial No. 658,183. Divided and this application filed September 22, 1925. Serial No. 57,950.

This invention relates to processes for preparing compositions of rubber latex which may be used as paints or similar coating materials. It also relates to the compositions produced thereby.

Cold water paint in general consists of a suspension of certain mineral pigments in water, for example, whiting and calcium sulfate, together with glue or casein as a binder. In addition certain hardening agents such as alum may be added. The paint therefore in reality consists of a type of whitewash which, however, is an improvement on the ordinary whitewash since the glue or casein is present as a binder and make the coating adherent and coherent. It is not however waterproof, and surfaces painted with cold water paint are easily spotted or entirely defaced by the action of water.

It has been found however that this defect is very greatly lessened by the addition of rubber latex to mixtures of the type above described. Glue still preserves its valuable properties as a binder but the whole mass is rendered more waterproof by the presence of the rubber in the latex. On the other hand the paint is still a water suspension and at the same time gives a relatively water-proof coating without using an expensive and inflammable organic vehicle. The vehicles ordinarily employed in connection with oil paints are substantially water-proof and not defaced by the action of water. Such vehicles are turpentine, linseed oil, etc. These paints of course are relatively expensive.

The objects of the present invention are to eliminate the disadvantages of the prior processes for preparing cold water paints. The primary object is to prepare a paint of the cold water type employing an aqueous dispersion of rubber, either artificial or the natural dispersion known as rubber latex.

With a preferred embodiment in mind but without intention to place undue limitations upon the scope of the invention, the invention briefly consists in preparing an uncoagulated mixture with rubber latex of pigment, binding agent, and protective colloid. The invention also includes the addition of materials adapted to alter the properties of the latex, as for example increasing viscosity, adhesiveness, cohesiveness, plasticity and surface tension, and particularly viscosity and adhesiveness.

This application is a division of our copending application Serial No. 658,183, filed August 18, 1923, which latter is a continuation as to this subject matter of our application Serial No. 538,130, filed February 20, 1922.

As an example of a cold water paint employing latex, the following composition is preferred.

| | Parts by weight |
|---|---|
| Gilder's whiting | 82 |
| Mineral flour | 10 |
| Glue | 3 |
| Latex enough to make dry rubber | 5 |
| Water | 33 |

The gilder's whiting and mineral flour in the above formula serve particularly to modify the plasticity of the mass but also vary the viscosity, the glue serving to increase the cohesiveness and adhesiveness of the resulting paint film. In mixing up this composition first glue is dissolved in water, the whiting and mineral flour are mixed together and added to the water and the latex is incorporated last to prevent its coagulation. The above example produces a white cold water paint. It is to be understood, however, that various other colors such as ultra-marine blue, Calcutta red, excello green, and vulcan yellow No. 1 may be employed with satisfactory results.

A hardening effect may be secured by adding to the composition given vulcanizing mixtures functioning at ordinary temperatures such as oxy normal butyl thiocarbonic acid disulphide and zinc butyl xanthogenate and dibenzyl amine with sulphur and zinc oxide.

As an example of a paint having properties more closely approaching the oil paints and containing a higher percentage of latex, the following composition has given satisfactory results:

|  | Parts by weight |
|---|---|
| Gilder's whiting | 5 |
| Mineral flour | 5 |
| Silurian shale | 5 |
| Glue | 10 |
| Latex sufficient to give dry rubber | 25 |
| Water sufficient to make a fluid having approximately the consistency of a thin cream. | |

In the above formula the Silurian shale serves with the mineral flour to modify the plasticity and viscosity in the resulting mass. It also affects the cohesiveness thereof. The glue modifies plasticity, viscosity, cohesiveness and adhesiveness.

In combining the ingredients of the composition the Silurian shale is soaked in water and in the form of a 5% suspension is added to a water solution of the glue containing gilder's whiting and mineral flour. The latex is added last. This material may be vulcanized in any desired manner, as by the use of the vulcanizing agents mentioned in connection with the preceding example.

The coatings obtained by the application of these compositions are substantially water-proof and are not easily spotted or defaced by the action of water. These solutions are more expensive than the cold water paints in an amount dependent upon the quantity of rubber employed. They are less expensive than oil paints.

It will be understood that various other materials than mineral flour, gilder's whiting, and Silurian shale may be employed, and any of the pigments ordinarily employed in paint manufacture may be utilized, as well as various dyes and other coloring materials. Other protective colloids than glue, such as sodium silicate, saponin, and other materials generally classed as protective colloids. If desired the protective colloid and binding material need not be the same substance, but mixtures of various substances may be employed. For instance glue may be used as the binder and sodium silicate or saponin or other protective colloid may be employed in admixture with the glue. The latex as stated above may be the natural rubber latex in diluted, normal or concentrated form, or the latex may be an artificial aqueous dispersion of rubber.

The process is a simple efficient method of obtaining a paint of the cold water type which is liquid at room temperatures. A modification of the various properties such as plasticity, viscosity, cohesiveness and adhesiveness makes possible the production of a homogeneous coating composition in which the various ingredients remain uniformly suspended, and the composition clings more readily, to the surface to which it is applied.

Having thus described our invention, what we claim and desire to protect by Letters Patent is:

1. A cold water paint fluid at room temperature and comprising a non-oily aqueous suspension of pigmentary material, a protective colloid having adhesive properties, and dispersed rubber.

2. A cold water paint fluid at room temperature and comprising a non-oily aqueous suspension of pigmentary material, a protective colloid, a binder, and rubber latex.

3. A cold water paint fluid at room temperature and comprising an aqueous suspension of mineral pigment, coloring, a protective colloid, glue, and rubber latex.

4. As a cold water paint, a pigment, colloidal clay, glue, latex, and water sufficient to make a fluid having approximately the consistency of a thin cream.

5. A cold water paint comprising the following substances in approximately the proportions specified: gilder's whiting 82 parts by weight, mineral flour 10 parts by weight, glue 3 parts by weight, latex sufficient to produce 5 parts by weight of dry rubber, water 33 parts by weight.

Signed at New York, New York, this 3rd day of Sept., 1925.

ERNEST HOPKINSON.

Signed at New York, New York, this 10th day of Sept., 1925.

M. C. TEAGUE.